United States Patent Office 2,889,896
Patented June 9, 1959

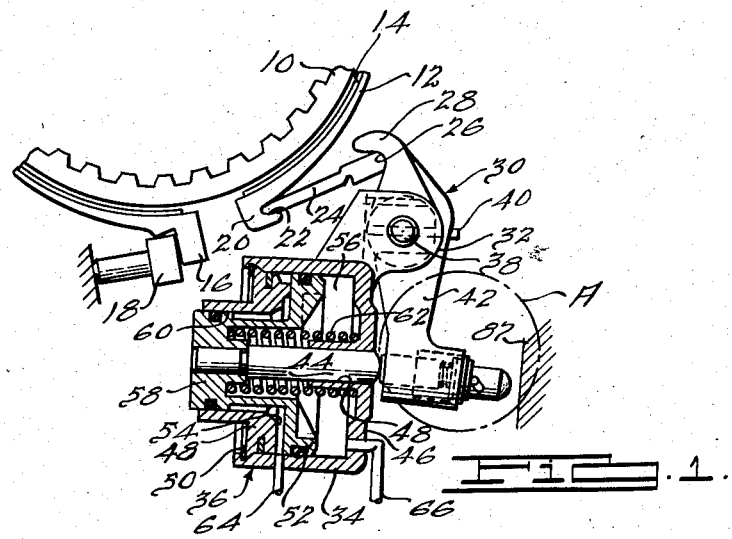

2,889,896

SELF ADJUSTING SERVO

George W. Schulz, Detroit, and John O. Gambee, Wayne, Mich., assignors to Ford Motor Company, Dearborn, Mich., a corporation of Delaware Application July 24, 1956, Serial No. 599,746

3 Claims. (Cl. 188—196)

Our invention relates generally to automatic control mechanisms and more particularly to a new and improved servo mechanism for use with gear type automatic transmissions for controlling the relative motion of the gear elements thereof to effect variations in the transmission speed reduction ratio.

It is common practice in the transmission art to employ band type brake means for selectively holding and releasing certain gear members of a multiple speed transmission, said brake means including a brake drum carried by or forming a portion of the rotary gear elements and a friction band encircling the drum. A fluid pressure operated servo may be employed for tightening the brake band when braking is desired, a suitable mechanical linkage usually being employed for transferring the actuating forces of the servo to the brake band. After repeated application of the brake band, wear occurs in the friction surface of the band and this in turn requires compensating adjustments in the mechanical connection between the band and the band actuating servo in order to maintain a uniform free travel of the servo.

According to a principal feature of our invention, we have provided a servo mechanism which includes an automatic brake adjusting means which functions during operation of the mechanism to maintain an optimum free travel of the piston member associated with the servo with a minimum of variation.

The provision of an improved servo mechanism of the type above set forth being a principal object of our invention, it is a further object of our invention to provide a self adjusting motion controlling mechanism which is capable of making automatic adjustments for wear and which eliminates the need for manual adjustments and periodic maintenance.

It is a further object of our invention to provide a self adjusting mechanism of the type above set forth which is simple in construction, reliable in operation and which may be readily adapted to be used with motion controlling mechanisms of known construction.

As presently disclosed, we have applied the principles of our invention to a brake mechanism of the type above described, but we contemplate that it may also be applied to clutch mechanisms for maintaining a predetermined clearance between the clutch friction elements and the clutch actuating member associated therewith.

In carrying forth the foregoing objects, the band adjusting mechanism of our invention may be carried by the linkage interconnecting the brake band of the brake mechanism and the brake operating servo, the piston member of the servo being adapted to act against the servo adjusting mechanism during operation. The adjusting mechanism comprises a first member threadably connected to the linkage and a second member telescopically related with respect to the first member. The first and second members are interconnected by cam means in the form of a pin and slot connection, the axis of the slot forming an acute angle with respect to the axis of the first and second members. A spring element is interposed between the first and second members for normally urging the pin toward one end of the angular slot and a one-way brake means is provided for restraining relative motion between the second member and the brake linkage in one direction while permitting relative rotation in the other direction. A stationary abutment is positioned adjacent one end of the second member and it is contacted by the same when the movement of the brake linkage during operation exceeds a predetermined value. As the linkage continues to move after the abutment is contacted by the second member, the pin and slot connection causes the second member to rotate about its axis and compress the spring interposed between the first and second members. When the load supplied by the servo is released, the spring and the pin and slot connection causes the first member to rotate within its threaded connection with the linkage mechanism, the torque reaction accompanying this rotation being absorbed by the one-way brake means which resists rotation of the second member in the opposite direction. The rotation of the first member with respect to the linkage mechanism causes the same to assume a new axial position which compensates for the wear on the friction surface of the brake band.

For the purpose of more particularly describing the principal features of our invention, reference will be made to the accompanying drawings wherein:

Figure 1 is a cross sectional assembly view of a motion controlling mechanism including a brake band, a brake actuating servo and a mechanical linkage interconnecting the band and servo, the latter including the servo adjusting feature above described;

Figure 2 is a cross sectional subassembly view of the band adjusting mechanism of our instant invention, the structure appearing in Figure 2 being an enlargement of the portion of the assembly of Figure 1 which is encircled at A; and Figure 3 is a cross sectional view of a portion of the band adjusting mechanism of our instant invention and is taken along section line 3—3 of Figure 2.

Referring first to Figure 1, numeral 10 is used to designate a brake drum of the type commonly used with planetary transmission gear elements. Brake band 12 surrounds the drum 10 in a conventional manner and it includes a friction surface 14 on the inner surface thereof. One end of the brake band 12 carries an abutment 16 which contacts an anchor member 18 connected to or carried by the transmission casing in a suitable fashion. The other end of the brake band is formed with an abutment 20 which defines a recess 22 within which is positioned a spacer 24 as indicated. The other end of the spacer 24 is received within a recess 26 formed on one arm 28 of an operating crank generally designated by numeral 30.

The crank 30 is pivotally mounted on a flange 32 formed on the outer casing 34 of a servo generally designated by numeral 36. The pivoted connection between the flange 32 and the crank 30 includes a pin 38 transversely received through the flange 32 and the crank 30, and relative transverse movement of the crank 30 with respect to the flange 32 may be prevented by a transverse retaining pin 40.

The other arm of the crank 30 is designated by numeral 42 and it carries at the extreme end thereof the adjusting mechanism of our instant invention which will subsequently be described with reference to Figures 2 and 3. The arm 42 is situated directly adjacent the aforementioned servo casing 34 and is adapted to be moved by a plunger 44 slidably received through an end wall 46 of the casing 34, a central aperture 48 being provided for this purpose. The other end of the casing 34 has received therein a closure member 48 which may be retained in place by a snap ring type fastener 50. The wall 46 and the closure member 48 define in part a fluid chamber within which is slidably positioned a piston member 52, said piston member defining a pair of opposed fluid working chambers identified by numerals 54 and 56.

The piston 52 has formed thereon an extension 58 which is slidably received through an opening 60 in the closure member 48, said plunger 44 being joined to the piston member extension 58 as indicated. The plunger 44 and the piston member 52 are urged in a left hand direction as viewed in Figure 1 by a spring 62 interposed between the extension 58 and the wall 46 in concentric relationship with respect to the plunger 44. Fluid pressure may be admitted to the working chamber 54 through a fluid pressure supply conduit 64 to move the piston member 52 and the plunger 44 in a right hand direction against the opposing force of the spring 62. A similar conduit 66 communicates with the opposed working chamber 56 for accommodating the exhaust flow of fluid from the working chamber 56 when the servo piston member 52 moves in a right hand direction and for admitting fluid pressure to the working chamber 56 to release the servo if desired.

Referring next to Figures 2 and 3, we have illustrated in more particular detail that portion of the above described control mechanism included within the reference circle A. It will be apparent from inspection of Figure 2 that the arm 42 of the crank member 30 is formed at the lower end thereof with a cylindrical type recess 68 extending in a direction perpendicular to the pivotal axis of the crank 30. The end of the recess 68 is formed with a threaded opening 70 within which is threadably received an externally threaded member 72. The outer end 74 of the member 72 is adapted to be contacted by the plunger 44 of the servo 36 as illustrated in Figure 1. The member 72 is formed with a reduced diameter portion 76 which is telescopically received within a sleeve member 78 shown partly in elevation and partly in section in Figure 2, said member 78 comprising a closed end cylinder with an enlarged cylindrical section 80. A substantial clearance is provided within the end of the reduced diameter portion 76 and the adjacent end of the cylindrical sleeve member 78 as indicated. The sleeve member 78 is further provided with a slot 82 having an axis which forms an acute angle with the axis of the members 72 and 78. A pin 84 is received through the slot 82 and is fixed to the reduced diameter portion 76 of the member 72.

A compression spring 86 is interposed between the two members 72 and 78 for normally biasing the same outwardly thereby causing the pin 84 to normally assume the position illustrated in Figure 2 in which one end of the slot 82 is engaged by the pin 84. The outer end of the member 78 is situated directly adjacent an abutment member 87 which may form a part of the stationary transmission casing although many other types of stationary abutments would also suffice.

As best seen in the cross sectional view of Figure 3, a one-way brake band spring 88 encircles the cylindrical section 80 of the member 78 and one end thereof is deformed and received within a mating slot formed in the interior cylindrical surface of the recess 68, as illustrated in Figure 3 at 90. The other end of the band spring 88 frictionally contacts the cylindrical section 80 and is free of the inner wall of the recess 68. It will thus be apparent that the member 78 is capable of rotating with respect to the arm 42 of the crank 30 in a counterclockwise direction as viewed in Figure 3 since the tangential force resulting from a frictional engagement between the band spring 88 and the member 78 tends to unwrap the spring 88. It will also be apparent that relative rotation of the member 78 with respect to the arm 42 in a clockwise direction as viewed in Figure 3 will be prevented since the tangential force exerted on the spring 88 by reason of the frictional engagement with member 78 will cause the spring 88 to tighten about the member 78 and lock the latter to the arm 42. The construction illustrated in Figure 3 thus serves as an effective one-way brake.

During operation, fluid pressure may be admitted to the working chamber 54 through the conduit 64 to move the piston member 52 and plunger 44 into engagement with the end 74 of the member 72 thus causing the crank member 20 to rotate in a counterclockwise direction as viewed in Figures 1 and 2. This counterclockwise movement causes brake band 12 to tighten about the brake drum 10 with friction surface 14 engaging the outer surface of the drum 10. It is contemplated that the clearance between the member 78 and the abutment 87, which exists when the servo is in the energized position, will be substantially zero. If wear occurs in the friction material 14, the travel of the piston member 52 of the servo 36 will increase thereby causing the member 72 to move telescopically with respect to the member 78 after the latter contacts the abutment 87. This telescopic movement of the members 72 and 78 will cause the pin 84 to move within the slot 82 thus imparting a rotary motion to the member 78 about its own axis, the one-way brake construction illustrated in Figure 3 accommodating this rotary motion as previously described. In the present embodiment, this rotary motion is in a clockwise direction as viewed in the direction of section 3—3 of Figure 2. When the servo brake operating force is relieved, the piston 52 is returned to the retracted position as illustrated in Figure 1 and the compression spring 86 will then tend to urge the member 78 outwardly with respect to the member 72 thus causing the pin 84 to engage one side of the slot 82. The pin and slot connection 82 and 84 will thus cause a torque to be imparted to the member 72 and a reverse torque reaction to be imparted to the member 78. However, the torque reaction exerted on the member 78 is in a direction which would tend to cause band spring 88 to tighten about the member 78 thus preventing rotation of the member 78. Since rotation of member 78 is thus prevented, member 72 will be caused to rotate within its threaded connection with the arm 42 thereby causing the same to assume a newly adjusted position which compensates for the wear in the brake band 14. In the present embodiment, this rotation is in a clockwise direction as viewed in the direction of section 3—3 of Figure 2. It is thus obvious that the travel of the piston 52 and the movement of the crank member 30 will remain substantially constant regardless of the amount of wear in the brake band 14, and that the compensating adjustments in the linkage takes place entirely automatically with no maintenance being required.

Although we have particularly illustrated and described a preferred embodiment of our invention, we contemplate that various changes therein may be made without departing from the scope of the invention as defined by the following claims.

We claim:

1. A motion transmitting mechanism comprising a lever, a driving member, a first adjustable member threadably connected to said lever and adapted to be engaged by said driving member, a second adjustable member telescopically related with respect to said first member, a slot situated in one of said members in a direction forming an acute angle with respect to the axis of said members, a pin carried by the other member, said pin being received within said slot to effect rotary movement of said second member in one direction when the same is moved telescopically relative to the said first member, an abutment disposed adjacent said second member and adapted to be engaged by said second member upon movement of said lever beyond a predetermined range of positions, and a one-way brake means for preventing rotation of said second member in the opposite direction and spring means for normally biasing said members apart, said lever being formed with a cylindrical recess, said members being coaxially disposed relative to said recess, one portion of said second member and said recess defining radially adjacent cylindrical surfaces, said one-way brake means comprising a band spring encircling said one portion of said second member, one end of said band spring being anchored in one of said surfaces and the other end thereof frictionally engaging the other of said surfaces.

2. In a motion transmitting mechanism, a lever, a cylindrical recess formed in said lever, a first adjustable member threadably connected to said lever and adapted to be engaged by a movable operator, said first member extending axially through said recess in concentric relationship therewith, a sleeve member slidably received over one end of said first member including a first portion extending outwardly from said recess and a second portion situated within said recess, cam means for coupling together said sleeve member and said first member to effect relative rotary movement therebetween as said sleeve member is moved telescopically relative to said first member, spring means acting between said sleeve member and said first member for urging the latter outwardly from said recess, said recess and said sleeve member defining radially adjacent cylindrical surfaces, a band spring situated circumferentially between said surface, one end of said spring being anchored in one of said surfaces and the other end thereof freely frictionally engaging the other of said surfaces thereby inhibiting rotary motion of said sleeve member in one direction while accommodating rotary motion thereof in the other direction, and a stationary abutment situated in the line of motion of said sleeve member and adapted to engage the same when said lever is moved beyond a limiting angular extent.

3. A slack adjustor for a servo operated mechanism including an operating lever having a servo operated part and a work performing part, a recess formed in said first mentioned part and defining therein an internal cylindrical wall, an adjusting member threadably carried by said first named part and extending axially through said recess, said adjusting member being adapted to be mechanically engaged by a fluid pressure operated portion of said servo, a sleeve member slidably received over said adjusting member in telescopic relationship therewith, cam means forming a mechanical connection between said adjusting member and said sleeve member for effecting rotation of said sleeve member in one direction within said recess, spring means acting between said sleeve member and said adjusting member for urging said sleeve member in an outward direction, said sleeve member having a portion situated in radially adjacent relationship with respect to a portion of said cylindrical wall, and a one-way brake band spring encircling said sleeve member, one end of said spring being anchored in one of said adjacent portions and the other end thereof freely engaging the other adjacent portion whereby rotation of said sleeve member in the other direction within said recess is inhibited, and a stationary abutment situated in the line of motion of said first named lever part, said sleeve member being engageable with said abutment thereby effecting rotary and telescopic movement thereof relative to said adjustable member.

References Cited in the file of this patent
UNITED STATES PATENTS

| | | |
|---|---|---|
| 2,220,599 | Galter | Nov. 5, 1940 |
| 2,677,441 | Roberts | May 4, 1954 |
| 2,728,428 | Cohen | Dec. 27, 1955 |
| 2,735,029 | Dyer et al. | Feb. 14, 1956 |